United States Patent
Susarla et al.

(10) Patent No.: US 6,915,511 B2
(45) Date of Patent: Jul. 5, 2005

(54) DYNAMIC CLASS RELOADING MECHANISM

(75) Inventors: Hanumantha Rao Susarla, Bangalore (IN); Mukesh Garg, Bangalore (IN); Sandhya E, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 524 days.

(21) Appl. No.: 09/895,287

(22) Filed: Jun. 29, 2001

(65) Prior Publication Data

US 2004/0015936 A1 Jan. 22, 2004

Related U.S. Application Data

(60) Provisional application No. 60/292,906, filed on May 22, 2001.

(51) Int. Cl.[7] .................................................. G06F 9/44
(52) U.S. Cl. ........................ 717/166; 717/148; 717/164
(58) Field of Search ................................ 717/146–149, 717/162–167, 151–161; 718/1, 100–105

(56) References Cited

U.S. PATENT DOCUMENTS 6,571,388 B1 * 5/2003 Venkatraman et al. ...... 717/166

OTHER PUBLICATIONS

Liang et al., Dynamic Class Loading in Java Virtual Machine, ACM, pp.: 36–44, Oct. 1998.*
Gong, "Secure Java Class Loading", IEEE, pp.: 56–61, Dec. 1998.*
IBM Technical Disclosure Bulletin, "Java Dynamic Class Loader", vol. 39, No. 11, pp.: 107–108, Nov. 1996.*
"Class java.lang.ClassLoad," Sun Microsystems, Inc., *Submit a bug or feature*—Version 1.1.8 of Java Platform API Specification, 1995–1999, 6 pages.
"iPlanet Application Server Overview Guide", Chapters 2 & 4, Sun Microsystems, Inc., 2000, 14 pages.
"JAVA Language Reference," O'Reilly, 2nd Edition, Jul. 1997, 11 pages.
"Programmer's Guide (Java), iPlanet Application Server," Release 6.0, Apr. 2000, pp. 289–291.

* cited by examiner

Primary Examiner—Tuan Dam
Assistant Examiner—Ted T. Vo
(74) Attorney, Agent, or Firm—Robert C. Kowert; Meyertons, Hood, Kivlin, Kowert & Goetzel, P.C.

(57) ABSTRACT

A system and method for providing dynamic class reloading using a modular, pluggable and maintainable class loader is described. Each application in an application server (or alternatively in any implementation) may include a dynamic class loader module. The class loader module may include a hierarchical stack of class loaders. Each module in the application may be associated with its own class loader. Each class loader may be responsible for loading one or more classes. When a class is changed, the changed class may be detected by the class loader module. Any notification for a class change may come to the class loader controller so that the concerned class loader can be replaced. The class loaders for all classes that depend on the changed class may also be replaced. The replaced class loaders may then reload the affected classes.

66 Claims, 6 Drawing Sheets

| change in ↓ | reload → | Helper | Interface Stubs/ Skeletons | Servlets/JSPs | EJBs |
|---|---|---|---|---|---|
| Helper | | ✓ | ✓ | ✓ | ✓ |
| Interface/ Stubs/skeletons | | ✓ | ✓ | ✓ | ✓ |
| Servlets/JSPs | | | | ✓ | |
| EJBs | | | | | ✓ |

Class Loader Stacks of Applications

DYNAMIC CLASS RELOADING MECHANISM

PRIORITY CLAIM

This application claims benefit of priority of provisional application Ser. No. 60/292,906 entitled "Dynamic Class Reloading Mechanism" filed May 22, 2001, whose inventors are Hanumantha R. Susarla, Mukesh Garg and Sandhya E.

BACKGROUND OF THE INVENTION

1. Field of the Invention

This invention relates to computer software, and more particularly to a system and method for providing dynamic class reloading in applications.

2. Description of the Related Art

It is often necessary to make changes in the presentation logic and/or the business logic of applications. In the world of application servers that run large and often mission-critical applications, taking the server offline to get these changes reflected may not be possible. In the development environment, it is quite common for a developer to deploy an application or Enterprise JavaBeans™ (EJB™) bean, test it, and make certain changes to get desired results. Since deploying a business component like an EJB™ or assembling an application in itself is quite complex, in the development environment, whenever the developer changes a bean, the server has to be restarted to check the changes.

In application servers based on the J2EE™ (Java™ 2 Platform, Enterprise Edition) distributed computing model, the business presentation is typically represented using servlets and/or JavaServer Pages™ (JSP™), and the business logic typically runs in the form of distributed components such as EJBs. These application servers may, to an extent, provide for the reloading of servlets and JSPs at runtime through a custom class loader mechanism. The existing class loader framework is, however, based on older technologies, and versionabilty is provided assuming that there is no need for state maintenance of the components. The versionability criterion for classes is static and global for all applications.

A possible architecture for a class reloading mechanism is to have a separate class loader for each application, and to have the system class loader as the parent of the class loaders. The system class loader loads the standard classes and the application server core classes, and the application class loader loads the user-defined classes. This architecture is illustrated in FIG. 1. This architecture may addresses security and reloading issues, but does not provide an optimal class loading framework. Since there is a single class loader that handles all the classes in an application, all the loaded classes will be reloaded for a single class change. This is added overhead for the application server.

Class Loaders

The following section provides background information on class loaders, class loading, and class reloading, This information refers to the Java™ programming language and to the Java™ Virtual Machine (JVM) architecture as an example of an implementation of class loaders, loading, and reloading. This information, however, may be relevant to other architectures, programming languages, environments including virtual machine environments, platforms, applications, application servers and/or implementations of class loaders.

The default class loading mechanism in the JVM is to load the class file from a specified location into the memory and to execute the byte code as and when the request comes in for a particular class. The default class loader, which may be referred to as a system class loader, caches the class once it loads it. Therefore, if the class file changes after loading the class, the changes are not reflected in the program unless JVM is restarted.

Class loaders are one of the cornerstones of virtual machine architectures such as the JVM architecture. Class loaders enable a virtual machine to load classes without knowing anything about the underlying file system semantics, and may also allow applications to dynamically load classes such as Java™ classes as extension modules. For example, JVM has an embedded class loader called the primordial/system class loader. Virtual machines such as JVM may also provide a facility by which user can introduce a custom class loader. For example, in JVM, a hook is provided to the loading mechanism through the custom class loaders. A custom class loader may load a class before the primordial class loader does. Therefore, certain policies pertaining to loading classes, maintenance, fetching classes, etc. may be implemented by the custom class loader. The custom class loader may also, for example, specify the remote location from which the classes are loaded, and/or assign appropriate security. Programmatically speaking, class loaders are ordinary objects that may be defined in code (e.g. Java™ code). In Java™, class loaders are instances of subclasses of abstract class Classloader.

In Java™, classes and interfaces are dynamically loaded, linked, and initialized. Loading is the process of finding the binary form of a class or interface type with a particular name and constructing, from that binary form, a Class object to represent the class or interface. For example, a class or Interface C's loading is triggered by another class or interface D, which references C through its runtime constant pool. Class or interface loading may also be triggered by D invoking methods in certain Java™ class libraries such as Reflection. Once a class is loaded, it is linked and resolved. Linking involves verifying and preparing a class, its direct superinterfaces, its direct superclass and its element type (if its an array type). Resolving is the process of dynamically determining concrete values from symbolic references in the runtime constant pool is known as resolving.

A class object loaded by loader L1 has a runtime signature <C1,L1> inside JVM. Same class C1, when loaded by L2, has the runtime signature <C1,L2> and thus can be distinguished from <C1,L1> by its runtime signature.

Once a class loader loads a class, the same class loader cannot load a different version of the class, as JVM internally tightly couples the class with the class loader. To maintain type safety, the virtual machine must be able to consistently obtain the same class type for a given class name and loader. The virtual machine cannot trust any user-defined loadClass method to consistently return the same type for a given name. JVM has to ensure security and behavioral consistency. Therefore, the virtual machine internally maintains a loaded class cache. The loaded class cache maps class names and the initiating loaders.

The next time the loader tries to load the class, an already cached copy of the class will be returned, but reloading will not be performed. So to reload a class requires the class to be loaded by a new loader. A runtime class type is determined not by its name alone but by its class name and its defining class loader. So if two loaders L1 and L2 load a class, they are different.

Delegation Mechanism

The Java™ Development Kit (JDK™), version 1.2, introduces a delegation mechanism that was not provided by earlier versions of the JDK. When using many class loaders, the class loaders can be linked using a parent-child relationship. A loader, before trying to load a class, can forward the request to its parent. The loading of a class can be started by one loader and completed by another. If C is a result of the loadClass of loader Li, then Li is the initiating loader of C. If C is the result of the defineClass( ) of loader Ld, then Ld is the defining loader of C.

In the following, the class type is shown as <C,Ld> where C is the Class and Ld is the defining loader. CLi is used to depict the initiation of loading.

Consider an example with loaders L1 and L2, and classes C1, C2.

```
class C1{
    String s1 = "xyz";
    void g(){
        C2 c2obj= new C2();
        C2obj.f( s1 );
    }
}
class C2{
    void f(String s ){
        .....
    }
}
```

If C1 was loaded by L1 and C2 was loaded by L2, the symbolic reference of String inside C1 will be resolved by L1 (i.e. String class will be loaded by L1). C2 is loaded by L2. When a call happens to function f of C2 inside C1, the argument passed is <String, L1>, but the argument expected by f inside C2 is <String, L2> and there would be a class cast exception when trying to making a call. This problem happens because two different types of the same class were being used as one. This redundancy can be reduced by providing a parent class loader Lp to the loaders, which will take the responsibility of loading all the common classes that it can. Thus, both L1 and L2 will forward the request to Lp and will effectively end up loading String through Lp only once, thus maintaining consistency.

Framework of a Loader

The main methods in ClassLoader are:

```
public Class loadClass( String name)
protected final Class defineClass(String name, byte[] buf,
    int off, int len);
protected final Class findLoadedClass(String name)
protected final Class findSystemClass (String name)
protected Class findClass (String className)
```

Resolution Mechanism

As previously mentioned, resolution is the dynamic determination of symbolic references. The following example illustrates the resolution for a class C.

```
Class C extends D implements E {
    F f ;
    String s;
    C(){
        S = f.myString;
    }
    void myMethod(){
        f.itsMethod();
    }
```

```
}
direct superInteface: E
direct superClass : D
external class SymbolicReference : F
external Field Symbolic Reference : F::myString
external Method Symbolic Reference : F::itsMethod()
```

Direct superClass and direct superInterface are loaded at the time of the loading of C using the same loadClass of the loader which called a defineClass for C. Other Symbolic references are dynamically resolved.

Class: The defining loader of C is used to load this class.

Field: First the class to which field belongs is resolved. Then the field resolution attempts to look up the referenced field in the class and all its superclasses.

Constraints imposed: let <E, L1> be the class or interface in which the referenced field is actually declared and let L2 be the defining loader of D. Let T be the name of the type of the referenced field. The virtual machine imposes the loading constraint:

$T(L1)=T(L2)$.

First the class on which the method is called is resolved. After the class is resolved, the method is looked up in the class, its super classes or super interfaces. The following constraints may be applied. Let <E, L1> be the class or interface in which the referenced method is actually declared and let L2 be the defining loader of D. Let T0 be the name of the type returned by the referenced method, and let T1 ... Tn be the names of the argument types of the referenced method. The virtual machine imposes the loading constraint:

for i=1 to n:

$TiL1=TiL2$

J2EE™

The Java™ 2 Platform, Enterprise Edition (J2EE™) defines the standard for developing multitier enterprise Applications. J2EE™ simplifies enterprise applications by basing them on standardized, modular components, by providing a complete set of services to those components, and by handling many details of application behavior automatically, without complex programming. J2EE™ takes advantage of many features of the Java™ 2 Platform, Standard Edition, such as "Write Once, Run Anywhere™" portability, JDBC™ (Java™ DataBase Connectivity) API for database access, Object Management Group's Common Object Request Broker Architecture (CORBA) technology for interaction with existing enterprise resources, and a security model that protects data even in internet applications. Building on this base, J2EE™ adds full support for EJB™ components, Java™ Servlets API, and JSP™ among many other technologies.

Enterprise JavaBeans™ (EJB™)

EJB™ is a component architecture for the development and deployment of object-oriented, distributed, enterprise-level applications. Applications written using the EJB™ architecture are scalable, transactional, and secure.

JavaServer Pages™ (JSP™)

JSP™ is an extensible web technology that uses template data, custom elements, scripting languages, and server-side Java objects to return dynamic content to a client. Typically the template data is HTML or XML elements, and in many cases the client is a web browser.

Servlets

A servlet may be generally defined as a small program that runs on a server. In Java™, a servlet is a Java™ program that extends the functionality of a web server, generating dynamic content and interacting with web clients using a request-response paradigm.

J2EE™ Applications

A J2EE™ application may be defined as a deployable unit of J2EE™ functionality. This can be a single module or a group of modules packaged into an .ear file with a J2EE™ application deployment descriptor. J2EE™ applications are typically engineered to be distributed across multiple tiers in an n-tier computing model Modules In programming, a module may be a unit of code that may be maintained and reused by different programs. Modular programming is the concept that similar functions should be contained within the same unit of programming code (a module), and that separate functions should be developed as separate units of code (modules), so that the code can easily be maintained and reused by different programs. Object-oriented programming inherently encompasses modular programming. J2EE™ is an example of an environment that may use modular programming.

J2EE™ Module

A software unit that consists of one or more J2EE™ components of the same container type and one deployment descriptor of that type. There are three types of modules: EJB™, web, and application client. Modules can be deployed as stand-alone units or assembled into an application.

Container

An entity that provides life cycle management, security, deployment, and runtime services to components. Corresponding to every component type, there exists a container. Each type of container (e.g. EJB™, web, JSP™, servlet, applet, and application client) may provide component-specific services.

Application Servers

An application server is a server program in a computer in a distributed network that provides the business logic for an application program. The application server is frequently viewed as part of a three-tier application, consisting of a graphical user interface (GUI) server, an application (business logic) server, and a database server. More descriptively, it can be viewed as dividing an application into:

A first-tier, front-end, Web browser-based graphical user interface, usually at a personal computer or workstation A middle-tier business logic application or set of applications, possibly on a local area network or intranet server A third-tier, back-end, database and transaction server, sometimes on a mainframe or large server Older, legacy application databases and transaction management applications are part of the back end or third tier. The application server is the middleman between browser-based front-ends and back-end databases and legacy systems.

iPlanet™ Application Server (iAS™)

The iPlanet™ Application Server (iAS™), offered by iPlanet E-Commerce Solutions, provides a robust J2EE™ e-commerce platform for the development, deployment, and management of application services to a broad range of servers, clients, and devices. iAS™ maximizes application re-use and developer collaboration and demonstrates the potential of leveraging Java™ for large-scale web and wireless applications.

SUMMARY OF THE INVENTION

A system and method for providing dynamic class reloading using a modular, pluggable and easily maintainable class loader framework is described. In one embodiment, the dynamic class reloading mechanism as described herein may be applied to Java™ applications. Other embodiments may be applied to applications written in other programming languages. Each application in an application server (or alternatively in any implementation) may include a dynamic class loader module. The class loader module may include a hierarchical stack of class loaders. Each class loader may have one parent class loader and zero or more child class loaders. Each module in the application may be associated with its own class loader; in other words, there may be one class loader for each module. Each class loader may be responsible for loading one or more classes.

In one embodiment, the application may include a class loader module that may include a hierarchical stack of class loaders that are each configured to load one or more classes for the application when invoked. In one embodiment, a class loader controller may provide an interface to the stack of class loaders and may be configured for use in invoking the class loaders to load the classes. The class loader controller may be configured to receive a request to load a class. In response to receiving the request, the class loader controller may first locate the appropriate class loader in the stack of class loaders and then invoke the located class loader.

In one embodiment, the application may be executing within an application server. The application server may include a plurality of applications executable within the application server, and one or more of the application may include an application-specific class loader module configured for use in loading and reloading classes for the particular application. Each class loader module may include an application-specific, hierarchial stack of class loaders for the application. In one embodiment, each application may include an application class loader that is responsible for loading cross-module classes in the application. The application class loader may be the parent of module-specific class loaders in the application-specific hierarchical stack of class loaders. In one embodiment directed at Java™ applications, below the module level loaders are Web class loaders and EJB™ class loaders. In one embodiment, to enforce module level separation of the utility classes, the class loader stack may include another layer between the application class loader and the other layers. This layer may load all the classes that are visible only to a module but not cross-module. The application server may include a system class loader that is the parent of each of the application class loaders and which is responsible for loading "core" classes for the application server.

At some point, one or more of the classes used by the application may be changed. For example, a programmer may make a modification to a class. The application may detect that a class has been changed. In one embodiment, the application may include a dirty class monitor that may monitor classes used by the application and detect when any of the classes have been changed. The class loader for the class may be replaced with a new version of the class loader configured to load the changed class. In one embodiment, the dirty class monitor may notify the class loader controller that the class has been changed. The class loader controller may then locate the class loader responsible for loading the class in the hierarchical stack of class loaders. The class loader controller may then replace the class loader with the new class loader. If there are one or more classes that depend on the class to be reloaded, the class loaders responsible for reloading the dependent classes may be located and replaced as well. If one or more of the dependent classes are loaded by the same class loader that is responsible for loading the changed class, then the class loader may only be replaced once. After replacing the class loader(s), the new class loader may load the changed class (which may be referred to as "reloading the class"). In one embodiment, dependent classes, if any, may also be reloaded by their respective class loaders. In one embodiment, the class loader controller may invoke each of the necessary class loaders to reload the class(es) that need to be reloaded in response to the change in the class.

Figure 1:
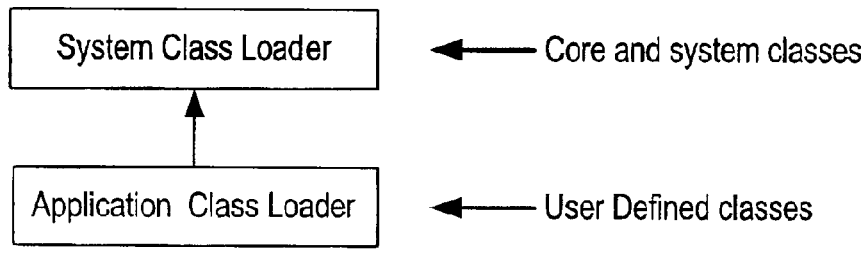
FIG. 1 illustrates one embodiment of the architecture of a class reloading mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

A system and method for providing dynamic class reloading using a modular, pluggable and easily maintainable class loader is described. In the complex software development scenarios of the day, dynamism may be an important feature in the components being built. The same holds true for an application server's application execution capabilities. Application developers tend to look for more in terms of security and the dynamic maintainability of applications. This document describes embodiments of a dynamic class reloading mechanism using modular, pluggable and easily maintainable class loaders for applications in application servers. The dynamic class reloading mechanism enables the changing of the functionality of applications running within an application server without requiring the restart of the server. Using the dynamic class reloading mechanism, only a changed class and its dependent classes are reloaded, thus limiting the number of files that are affected on the application server.

In one embodiment, the dynamic class reloading mechanism as described herein may be used with Java™ 2 Enterprise Edition (J2EE™) applications in application servers. In one embodiment, the application server may be an iPlanet Application Server (iAS). In application servers such as iAS™ which are based on the J2EE™ distributed computing model, the business presentation is typically represented using servlets and/or JavaServer Pages (JSPs), and the business logic typically runs in the form of distributed components such as Enterprise JavaBeans™ (EJBs). Embodiments of the dynamic class reloading mechanism may provide dynamic reloading of Servlets, JSPs, EJBs and any other user-provided Java™ class while incurring minimum overhead.

While the dynamic class reloading mechanism is described herein in respect to applications in application servers, it is noted that embodiments of the dynamic class reloading mechanism may be used in any other application area that requires the dynamic reloading of classes. For example, the dynamic class reloading mechanism may be applied to Java™ programs and/or other object-oriented language programs executable within Java™ Virtual Machines and/or other operating environments. In general, the dynamic class reloading mechanism is flexible enough to be used by any enterprise application.

If only certain classes can be reloaded, then modification of classes that cannot be dynamically reloaded requires the restart of the whole system. Therefore, embodiments of the dynamic class reloading mechanism may allow any class or class-based object or module a developer changes to be reloaded (e.g. helper classes, EJBs, JSPs, etc.).

Dynamic Class Reloading

In one embodiment, an application server may be based on the Java™ 2 Enterprise Edition (J2EE™) distributed computing model. The application server may feature support for the J2EE. An example of an application server based on the J2EE™ is the iPlanet Application Server (iAS). In the J2EE™ application arena, the class spectrum may be broadly classified as:

Standard Java™ classes (java.*, javax.*)

Application server core classes (com.kivasoft.*, com.netscape.*, etc.)

User-defined classes (servlets, JSPs, EJBs; utility/helper classes).

Typically, the first two categories should not be reloaded, because it is on them that the application server, and thus the applications provided by the application server, run. In one embodiment, the dynamic class reloading mechanism may enable the reloading of classes in the third category. On an application server, embodiments of the dynamic class reloading mechanism may also:

Provide application level separation.

Reload classes as soon as possible when changed.

Follow a delegation mechanism that is a modification of the mechanism described in JDK, version 1.2.

Be easily extendable and maintainable.

Be compliant to the JDK, version 1.2.

Be compliant with the Servlet and EJB™ specifications by providing separate loaders for EJBs, JSPs, servlets, etc. to thus provide security for the classes/components.

In embodiments of the dynamic class reloading mechanism, the loaded class count for a class loader may be minimized. Thus, when the class loader is replaced, fewer classes may be replaced than in the class loader architecture described above. At the same time, the dynamic class reloading mechanism may optimize the number of class loaders to avoid having so many class loaders that maintenance is difficult.

Embodiments of the dynamic class reloading mechanism may provide a modular division of class loaders that may minimize the loaded class count and, at the same time, optimize the number of class loaders. In the dynamic class reloading mechanism, every module may be loaded by a different class loader.

Figure 2:
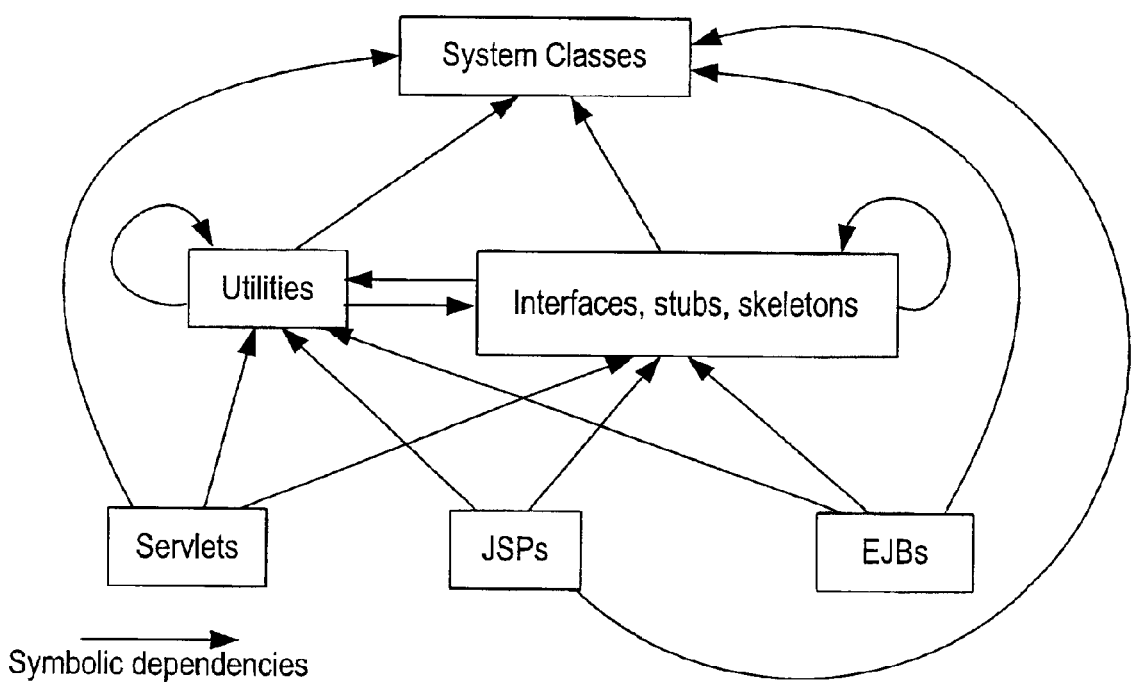
FIG. 2 is a dependency graph showing the dependencies among the types of classes in a typical application server according to one embodiment.

FIG. 2 is a dependency graph showing the dependencies among the types of classes in a typical application on an application server according to one embodiment. In one embodiment, the application may be a J2EE™ application. These class types are the components that are part of enterprise applications. Considering the symbolic dependency between the class types, the class types may be arranged as shown in FIG. 2. (If a class A instantiates another class B, class a is said to be symbolically dependent on class B.) Each arrow implies that the source class type maintains a reference to the target class type. EJB™ bean implementations, servlets and JSPs may have a symbolic reference to the utility classes and/or interfaces, stubs and skeletons. All the components may have symbolic references to System classes. Servlets and JSPs may not directly maintain a symbolic reference to other servlets and/or JSPs. Based on this layered dependency, the class loaders may be layered as well. Servlets, JSPs, and EJBs are at the bottom (lowest) layer. Utility classes, interfaces, stubs and skeletons are classes that may be used cross-module, so in one embodiment they may not be put in module-specific loaders.

Figures 3, 4:
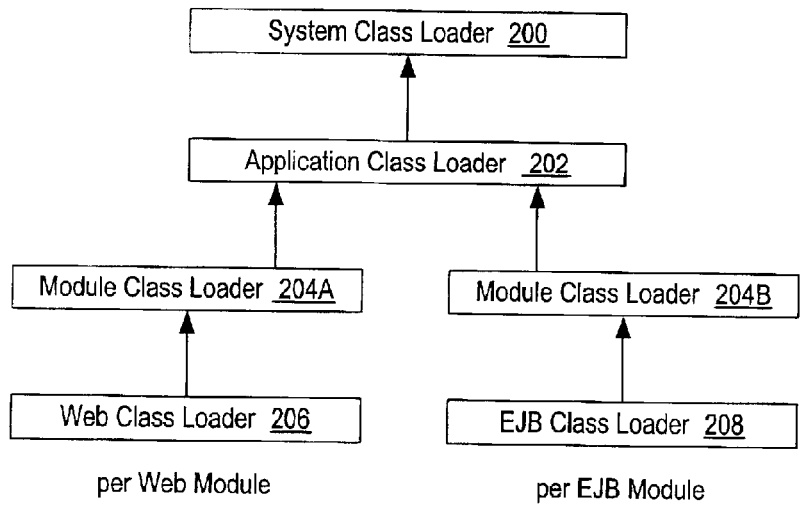
FIG. 3 is a table illustrating the triggering of class loading at different levels according to one embodiment.
FIG. 4 illustrates a class loader stack for an application according to one embodiment.

If a class changes, all the classes that use this class may be reloaded as well as the changed class. This implies that, if a class in a layer changes, then all the classes in lower layers may be reloaded as well as the changed class. So, if the system class loader is assumed to be at the highest level, then a change in a system class may trigger class reloading in all the lower levels (as well as the changed class at the system level). In general, if there are n layers, where n is the lowest layer and 0 is the highest layer, then change in a class at a layer m may trigger class reloading in layers (m, m+1 . . . n). FIG. 3 is a table illustrating the triggering of class loading at the different levels in one embodiment.

Examples of class changing may include, but are not limited to:

In one embodiment, if a helper Class changes, all underlying EJB™, Servlet and/or JSP™ class loaders may be replaced, and the EJBs, servlets, and/or JSPs reloaded, in addition to the changed helper class because the EJBs, servlets, and/or JSPs may be using the changed helper class.

In one embodiment, if an EJB™, interface or stub class changes (e.g. as a result of the redeployment of the EJB™), all underlying EJB™, Servlet and/or JSP™ class loaders may be replaced, and the EJBs, servlets, and/or JSPs reloaded in this application, as the EJBs, servlets, and/or JSPs may include a symbolic reference to this EJB™, interface, or stub class.

In one embodiment, if a bean implementation class changes, only the EJBClassloader that loaded it may be replaced, because classes in other class loaders do not contain a symbolic reference to this bean implementation class.

In one embodiment, if a servlet class or a JSP™ page class changes, only the Servlet or JSP™ which loaded it may be replaced, because classes in other loaders do not contain a symbolic reference to this servlet class or JSP™ page class.

In one embodiment, the dynamic class reloading mechanism may be implemented as a pluggable module referred to as a dynamic class loader module. Each application in a given implementation (for example, an application server) may include its own dynamic class loader module. The class loader module may include, but is not limited to, the following components:

A stack of class loaders

An interface to the class loaders (class loader controller)

A dirty class monitor.

The stack of class loaders may include a separate class loader for each module in the application. The class loader is responsible for loading classes that are not directly referenced across modules. For example, if there are n EJB™ modules in an application, the application may have n EJB™ loaders. As another example, if there are n web modules, there may be n servlet and/or JSP™ class loaders to load classes in them. In addition, there may be one or more class loaders for each application that is responsible for loading common classes referenced across the modules. The stack of class loaders provides granularity of the class loaders without breaking the functionality, and thus generates less overhead in reloading.

As for deciding which class is versionable and which class is not, there is a need to provide flexibility to the deployer in defining the different versionability criteria for classes in different applications. This need generally arises when an ASP (Application Service Provider) deploys applications for different customers. In one embodiment, these versionability criteria may be defined in the form of Registry entries that are globally applicable to all applications. In one embodiment, versionability of the applications may be controlled using the Disable Flag in the Registry under SYSTEM_JAVA/Versioning. In one embodiment, if the Disable flag is 0, then all the servlets, JSPs and/or EJB™ implementations are by default Versioned.

In one embodiment, a class loader controller may provide an interface to the stack of class loaders. Each application may have a class loader controller that provides a common entry point for loading the classes of the application. The class loader controller may handle the initializing of all the class loaders in the application's stack of class loaders. When a servlet and/or EJB™ container needs a class, it may forward the "load class" request to the class loader controller. The class loader controller then may determine which class loader is supposed to load the class. Every module may be loaded by its associated class loader, so the class loader may be assigned based on which module the class belongs to. Any notification for a class change may also come to the class loader controller so that it can recreate the concerned class loaders. In one embodiment, the class loader controller may also inform listeners (e.g. ServletRepository and EJBContainer) to reset their caches. By providing an interface to the class loaders, the class loader controller separates the logic of an application server's existing code from the class loading and reloading mechanism. Thus, the class loader controller is easily pluggable into an existing framework. The class loader controller may enable the addition of components/loaders without having to modify the container; only the class loader module needs to be modified.

FIG. 4 illustrates a class loader stack for an application according to one embodiment. Each application may include an application class loader 202 that may loads cross-module classes, utility classes, interfaces, stubs and skeletons for the application. A system class loader 200 is shown as the parent class loader of the application class loader 202. At the layer below the application class loader 202 are the module level loaders 204. In one embodiment, below the module level loaders are Web class loaders 206 and EJB™ class loaders 208.

In one embodiment, to enforce module level separation of the utility classes, the class loader stack may include another layer between the application class loader 202 and the other layers. This layer may load all the classes that are visible only to a module but not cross-module. The table of FIG. 3 illustrates the interdependency between the classes loaded by the class loaders in the class loader stack illustrated in FIG. 4, according to one embodiment.

In one embodiment, all of the independent modules that are deployed in the server may be handled by one stack of class loaders 110 that may be separate from any of the application-specific class loader modules. For example, the stack of class loaders 110 may be included in an independent class loader module for the application server.

Figure 5:
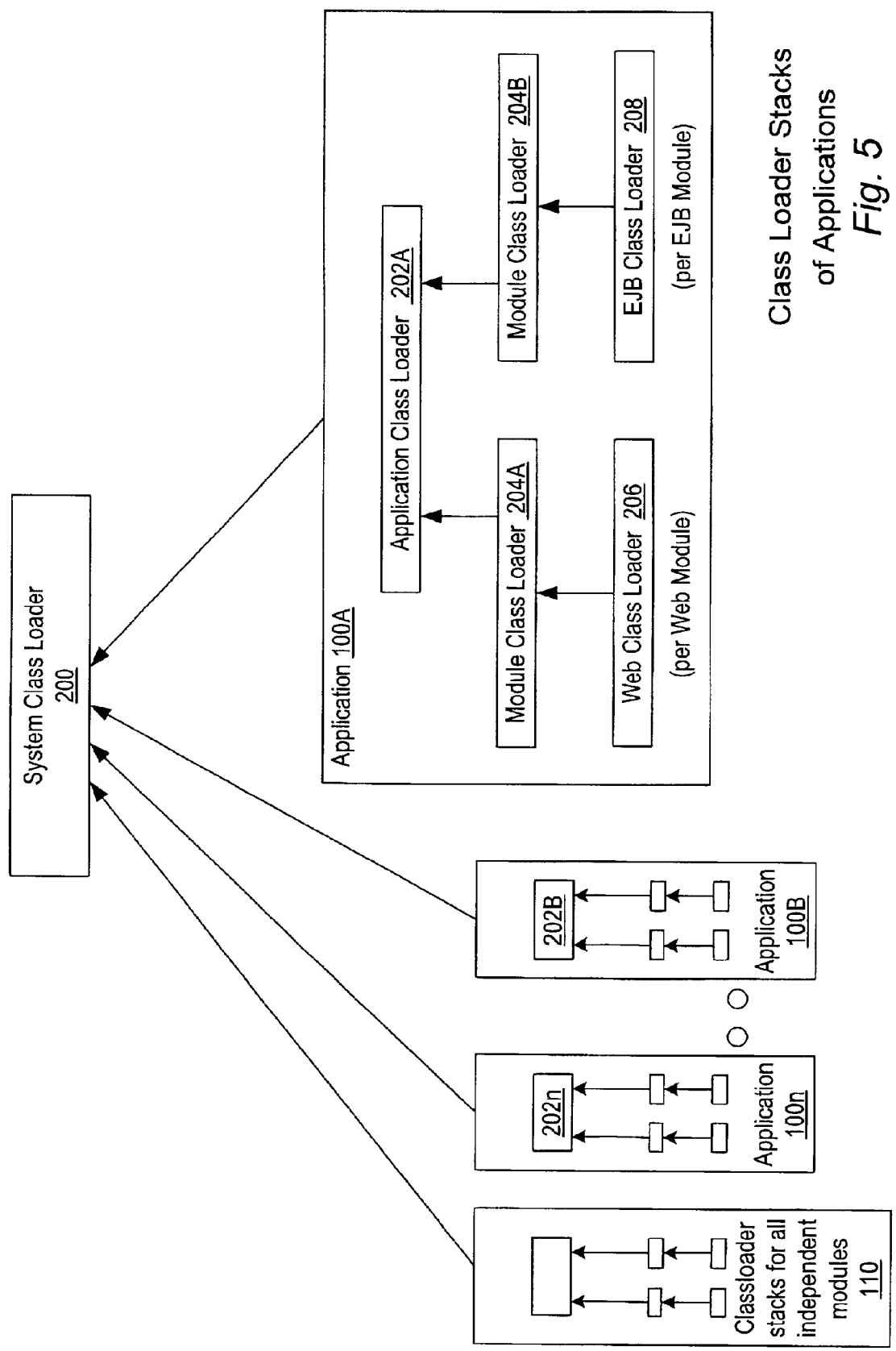
FIG. 5 illustrates application level separation of the class loader stacks according to one embodiment.

FIG. 5 illustrates application level separation of the class loader stacks according to one embodiment. In this embodiment, a system class loader 200 is shown as the parent class loader of all the application class loaders 202. In one embodiment, all the class loaders, after loading a class, may register the loaded class with a thread that monitors the change in the classes. In one embodiment, all application-specific classes may be encapsulated in the application 100 and may not be accessible by other applications 100, primarily for security purposes. If there were one class loader for all applications 100, then the loader would be capable of loading any application's classes. Thus, the security of the applications 100 may be lost. Application level separation requires the separation of the application class loaders 202. Otherwise, one application 100 may access the classes of other applications 100.

Figure 6:
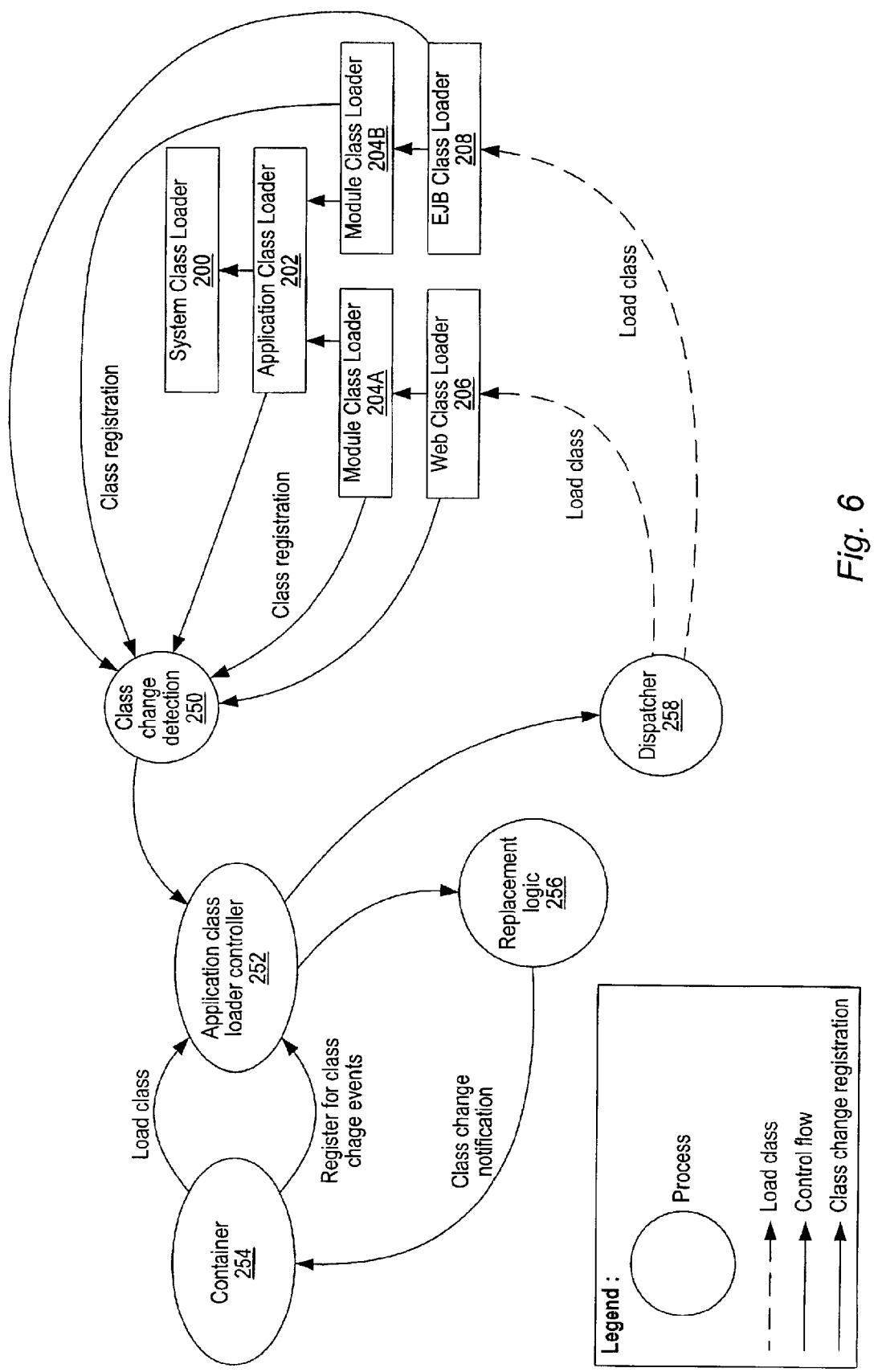
FIG. 6 illustrates the dynamic class reloading mechanism according to one embodiment.

FIG. 6 illustrates a dynamic class reloading mechanism according to one embodiment. The container 254 is the user of the class loader module. The container 254 may be a Web container or an EJB™ container, among others. The container 254 may create the application class loader controller 252 and use it to load the classes. The container 254 may interact with the application class loader controller 252 for:

"load class" requests.
Registering as a class change listener.
Receiving a notification from the replacement logic of the application class loader controller when a class changes.

Upon receiving a notification about the change of a class, the container 254 may get rid of the references to objects of the old class. For example, if the container 254 gets a message from the application class loader controller 252 that a particular servlet has been reloaded, the container 254 may flush the cache of the servlet objects that it is holding reference to. The same is true in case of other components, e.g. EJBs and JSPs.

The application class loader controller 252 may control the life cycle of all the class loaders in the stack. The application class loader controller 252 may also be responsible for dispatching the "load class" requests to the appropriate class loader. The application class loader controller 252 may initiate the reloading process whenever a class is changed. In one embodiment, the application class loader controller 252 calls a method registered by the container 254 whenever a loader is recreated, as explained above, to notify the container 254 of the class change.

Each loader in the stack of class loaders may use a standard "load class" method, which may be provided by the system class loader 200. However, the "find class" method called by the "load class" method may be different for different loaders. The "find class" method of a loader may perform the following:

Find the file path for the class being requested
If the file is not available, throw an exception and return. Otherwise:
Create the class; and
Construct and register the class details.

In one embodiment, the actual delegation mechanism may be handled by the "load class" method. Thus, a class loader's "find class" method may be executed only when all of its parents—direct as well as indirect parents—fail to load the class.

The dispatcher logic 258 may be used by the application class loader controller to dispatch the "load class" request to an appropriate class loader at the bottom of the stack. The decision may be made based on which module the class belongs to.

Class change detection logic 250 may check whether a class is dirty or not. In one embodiment, class change detection logic 250 may be a separate thread that runs periodically. All the loaders, after loading a class, may also register the loaded class with the class change detection logic 250. In one embodiment, the class change detection logic 250 may maintain data pertaining to a class in a data structure. For example, the following structure may be used:

```
class element {
    class name
    class path
    loader
    file
    last loaded time
    last modified time
}
```

In one embodiment, the following method may be used by the class change detection logic 250, assuming the polling frequency is x units:

For each x units of time interval:
For each registered class:
If the last loaded time for this registered class is less than the last modified time for this registered class, then call the replacement logic to replace this registered class.

In one embodiment, the class name and the class loader maintained in the class element may be passed to the replacement logic 256. The application class loader controller 252 may use the replacement logic 256 to replace the loaders and to notify the listeners registered for that module.

In one embodiment, the replacement logic 256 may be responsible for handling the replacement of class loaders. When a class needs to be reloaded, the class may have been previously loaded by a class loader. In one embodiment, to make the reloading happen, the class loader may be replaced with a new version, and the new class loader may then load the class.

As mentioned the class loaders may be arranged in layers. The layers may be numbered from top to bottom as 0 to n:
Layer 0
Layer 1
. . .
. . .
Layer n
In this stack, layer i is the parent of layer i+1. When a loader in layer i is changed, the following may be performed.

Find all of the loader's descendants, i.e., i+1 to n.
For each of the descendants of the loader:
Create a new loader of the same type.
Copy relevant properties from the old loader to the new one.
Assign the appropriate parent to the new loader.
Notify the listeners registered for the loader.

Figure 7:
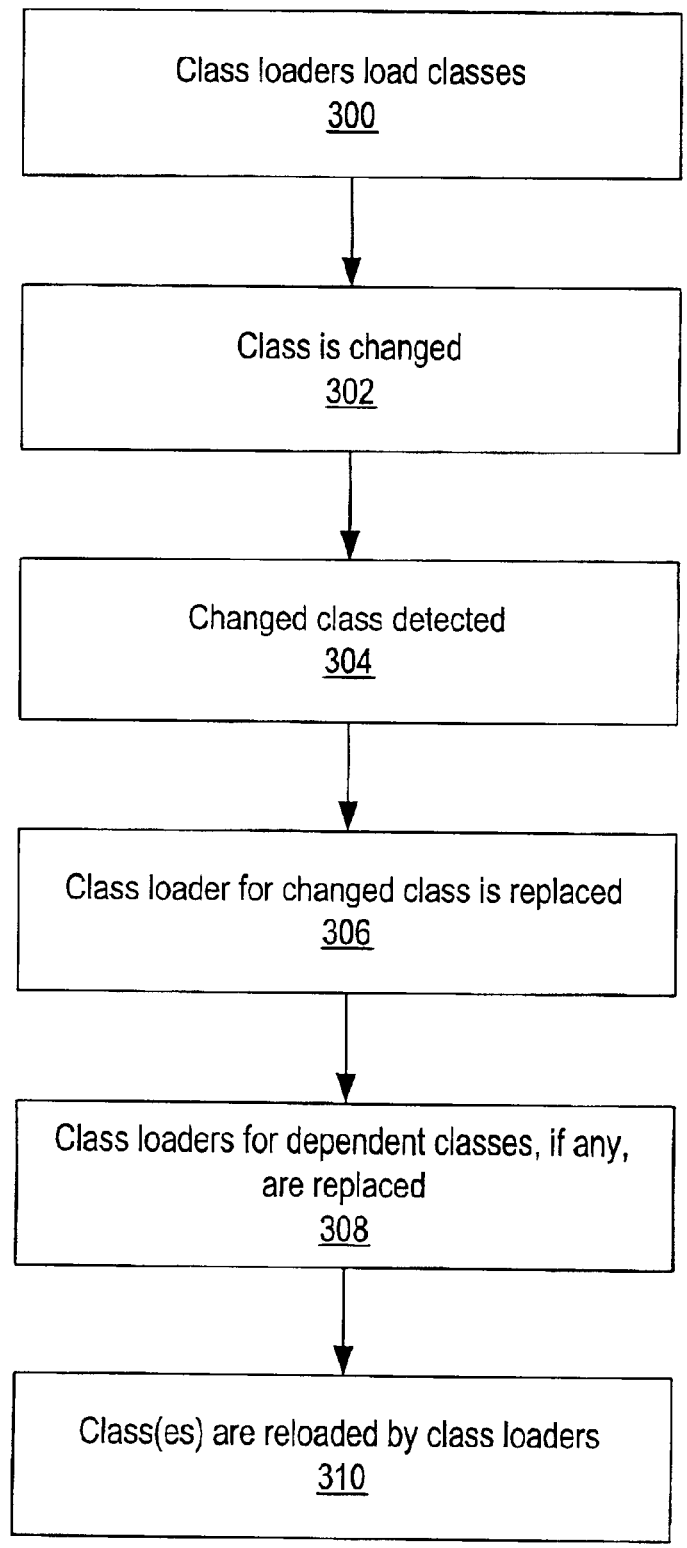
FIG. 7 is a flowchart illustrating a method for providing dynamic class reloading in applications according to one embodiment.

FIG. 7 is a flowchart illustrating a method for providing dynamic class reloading in applications according to one embodiment. As illustrated at 300, one or more class loaders may, when necessary, load classes for an application. In one embodiment, the application may include a class loader module that may include a hierarchical stack of class loaders that are each configured to load one or more classes for the application when invoked. In one embodiment, a class loader controller may provide an interface to the stack of class loaders that is configured for use in invoking the class loaders to load the classes. The class loader controller may be configured to receive a request to load a class, and may, in response to receiving the request, may first locate the appropriate class loader in the stack of class loaders and then invoke the located class loader.

In one embodiment, the application may be executing within an application server. The application server may include a plurality of applications executable within the application server, and one or more of the application may include an application-specific class loader module configured for use in loading and reloading classes for the particular application. Each class loader module may include an application-specific, hierarchical stack of class loaders for the application. In one embodiment, each application may include an application class loader that is responsible for loading cross-module classes in the application. The application class loader may be the parent of module-specific class loaders in the application-specific hierarchical stack of class loaders. The application server may include a system class loader that is the parent of each of the application class loaders and which is responsible for loading "core" classes for the application server.

As indicated at 302, at some point one or more of the classes used by the application may be changed. For example, a programmer may make a modification to a class. As indicated at 304, the application may detect that a class has been changed. In one embodiment, the application may include a dirty class monitor that may monitor classes used by the application and detect when any of the classes have been changed.

As indicated at 306, the class loader for the class may be replaced with a new version of the class loader configured to load the changed class. In one embodiment, the dirty class monitor may notify the class loader controller that the class has been changed. The class loader controller may then locate the class loader responsible for loading the class in the hierarchical stack of class loaders. The class loader controller may then replace the class loader with the new class loader. If there are one or more classes that depend on the class to be reloaded, the class loaders responsible for reloading the dependent classes may be located and replaced as well. If one or more of the dependent classes are loaded by the same class loader that is responsible for loading the changed class, then the class loader may only be replaced once. After replacing the class loader(s), the new class loader may load the changed class (which may be referred to as "reloading the class") as indicated at 310. In one embodiment, dependent classes, if any, may also be reloaded by their respective class loaders. In one embodiment, the class loader controller may invoke each of the necessary class loaders to reload the class(es) that need to be reloaded in response to the change in the class.

Dirty Class Monitor

Figure 8:
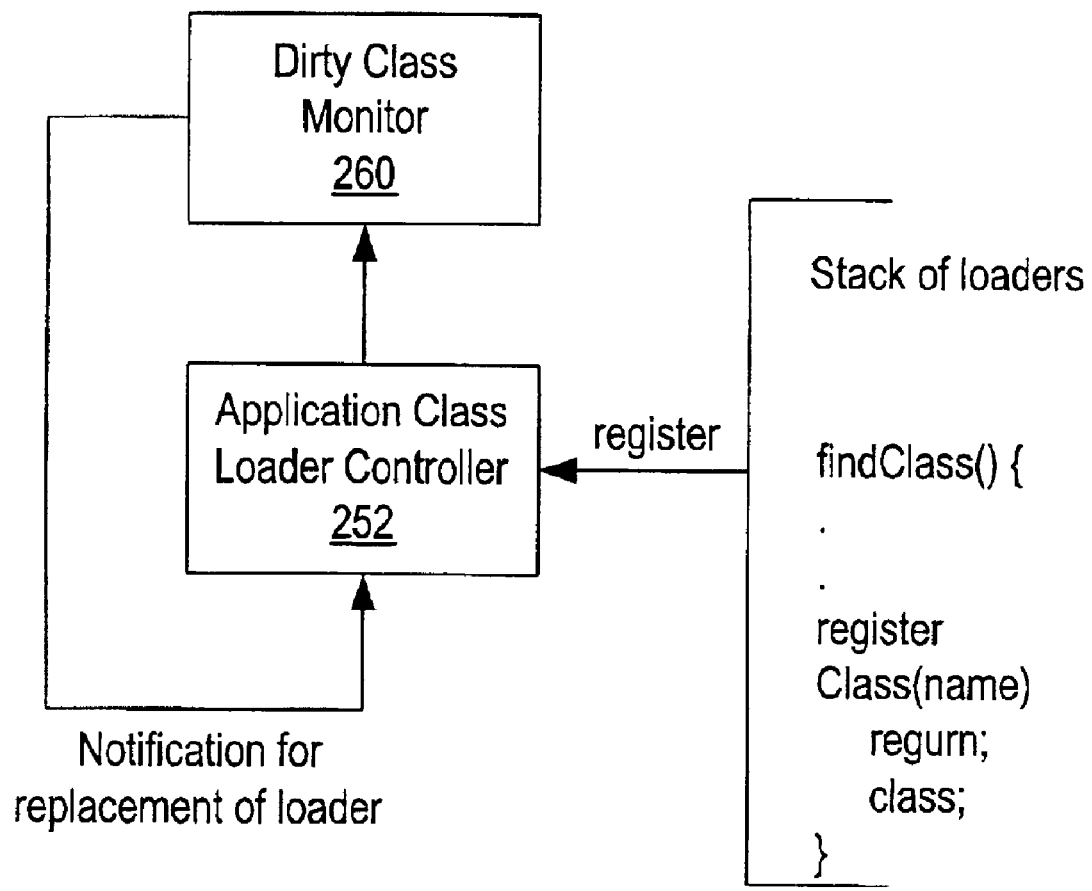
FIG. 8 illustrates a dirty class monitor (DCM) and its use by an application class loader controller (ACLC) according to one embodiment.

FIG. 8 illustrates a dirty class monitor 260 and its use by an application class loader controller 252 according to one embodiment. Along with loading the classes, the class loader module may also be responsible for monitoring the state of loaded classes. For this, the class loader module may maintain a separate thread running periodically to check for the state of class files. This thread may be referred to as a dirty class monitor 260. Tasks related to the dirty class monitor 260 may include, but are not limited to, registration and notification. Whenever the class loaders load classes, the classes may also be registered with the dirty class monitor 260 through the application class loader controller 252.

Module-specific Helper Classes

Helper (utility) classes in one module may be symbolically referenced by other module classes. For example, a class "Address" may be used by a "Billing" module and also by a "Shipping" module. In one embodiment, all helper classes may be loaded by the same class loader as the EJB™ interface classes. Another embodiment may allow for module-specific helper classes that are specific to a module and are not referenced by other modules. In this embodiment, another layer of module-specific helper class loaders may be added between the common EJB™ interface and/or helper class loaders and the EJB™ implementation class loader. Each module class loader may have a helper class loader which may be used for loading the module-specific classes.

Versionability

While developing an application, developers may need to make changes and to apply the changes without restarting the application server. Versionability means having the ability to reload a class. When the application is released, reloading of classes may not be allowed. In one embodiment, the versionability of the classes may be changed to mark that the classes may not be reloaded. For example, to improve performance, the reloading mechanism may be switched off using the versioning when an application is released from developers for general use.

One embodiment may provide a separate mechanism for making classes versionable according to the application's need. In one embodiment, this mechanism may be a tool that provides a graphical user interface (GUI) to dynamically configure the versionability. In another embodiment, this mechanism may be a data file that may be read to determine versionability.

Exemplary Classes

The following are descriptions of exemplary classes that may be used in implementing a dynamic class reloading mechanism as described herein.

Application Class Loader Controller Class

An application class loader controller class may include a constructor method:

AppClassLoaderController (String appName)

The constructor method may:
create an application class loader, passing the system class loader as its parent.
get all the modules of the application using the application descriptor.
find all EJB™ modules and create an EJB™ class loader for each EJB™ module, passing the application class loader as its parent.
find all web modules and create a servlet JSP™ class loader for each web module, passing the application class loader as its parent.

Add all the corresponding class paths and JAR paths (if any) to the EJB™ and web loaders. All the class paths may also be added to the application class loader.

The application class loader controller class may also include a load class method that may be implemented in any of various ways, including the following two examples:

loadClass (String className) public method loadClass (String className, string moduleName) public method The load class method may find which module the class className belongs to and forward the request to it. The load class method may have access to all the module directories that belong to that application. The class name may be converted to a class path format and appended to each module directory path. Wherever the file exists, it is given that particular loader.

A listener may include the notion of a class that may desire to be informed about a particular loader replacement. The application class loader controller may also include a register method for the listeners, for example:

AddClassChangedListener (lclassChangedListener cl)

Listeners that want to register themselves for any class change notification may do so using this method. In one embodiment, the listener may implement an interface including a class changed method. In one embodiment, this method may be used as a callback by the class loader controller to inform the listener about the loader replacement.

The application class loader controller class may also include a class changed method:

classChanged (classloader id, classname) public method

The class changed method may reload the class loaders and all of the child class loaders. The class changed method may also notify the corresponding listener about the class change.

Dirty Class Monitor Class

A dirty class monitor class may include a register class method:

registerClass (Class, classloaderid) public method

This method may add the class, along with the class loader identifier, to be monitored. This method may be called from the class loader which loaded this class.

A dirty class monitor class may also include a "do it" method:

doIt( ) private method

This method may be periodically called by the dirty class monitor thread to check for change in any registered class and to call the class changed method of the application class loader controller, passing the name of the changed class and the class loader identifier of the class loader which loaded the class.

Application Class Loader Class

The application class loader is the parent of all servlet JSP™ class loaders, and its parent class loader is the system class loader. The application class loader class may include a load class method:

loadClass (String className) public method

In this method, the load class request may first be passed to the parent of the loader. If the system class loader is not able to load the class, a check may be performed to determine if the request is for an EJB™, a Servlet or a JSP™. If it is determined that the request is for an EJB™, a Servlet or a JSP™, an exception may be thrown and the load method may return without attempting to load the class. If it is determined that the request is for an EJB™, a Servlet or a JSP™, the load class method may then attempt to load the class. If the class cannot be found or loaded by the load class method, the method may throw an exception (e.g. a class not found exception) and return.

The application class loader class may also include a find class method:

findClass (String className) protected method

This method may be called by the load class method of the application class loader if the parent class loader was not able to load the class. It reads the class file from the locations specified in its repository. In one embodiment, the repository may be in the form of a vector of URLs and Jar files. If the class is not an EJB™ implementation class or a servlet class, then the class may be loaded. Otherwise, a class not found exception may be thrown, which may be caught by its child class loader (which may then attempt to find and load the class).

The application class loader class may also include an add class path method that may adds the directory path to the application class loader's class path repository:

addClasspath (String path) public method

The application class loader class may also include an add Jar file method:

addJarFile (JarFile, String path) public method

This method may add the Jar file, along with the path, to the application class loader's Jar file repository. This method may also read a user-defined configuration file and determine if the class being loaded is versionable. If the class is versionable, the class may be registered with the dirty class monitor.

EJB™ Class Loader Class

An EJB™ class loader is responsible for loading EJB™ bean implementation classes only. The EJB™ class loader class may include a find class method:

findClass (String className) protected method

This method may be called by a load class method if the parent class loader was not able to load the class. It reads the class file from the location(s) specified in the repository. If the class is an EJB™ implementation class, then the class may be loaded. Otherwise, a class not found exception may be thrown, which may be caught by its child class loader.

The EJB™ class loader class may also include an add class path method that adds the directory path to its class path repository:

addClassPath (String path) public method

The EJB™ class loader class may also include an add Jar file method that adds the Jar file, along with the path, to its Jar file repository:

addJarFile (JarFile, String path) public method

Web Class Loader Class

The Web class loader class may include a find class method:

findClass (String className) private method

This method may be called by a load class method if the parent class loader is not able to load the class. This method reads the class file from the location(s) specified in the repository. If the class is a servlet class, then the class may be loaded. Otherwise, a class not found exception may be thrown, which may be caught by its child class loader.

The Web class loader class may also include an add class path method that adds the directory path to its class path repository:

addClassPath (String path) public method

The Web class loader class may also include an add Jar file method that adds the Jar file, along with the path, to its Jar file repository:

addJarFile (JarFile, String path) public method

CONCLUSION

The dynamic class reloading mechanism uses a layered structure, making it flexible and easily maintainable. Having a single in/out point to the class loader module makes it easily integratable into existing container code. The layered stack of class loaders may be extended to incorporate extra layers.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

In summary, a system and method for providing a dynamic class reloading mechanism have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method for reloading classes in an application, the method comprising:
    a class loader, in response to an invocation from a class loader controller, loading a class in the application, wherein the class loader is one of a hierarchal stack of class loaders each configured to load one or more classes in the application, wherein the class loader controller provides an interface to the hierarchal stack of class loaders and a common entry point for loading classes of the application;
    detecting the class has been changed;
    the class loader controller replacing the class loader in the hierarchy of class loaders with a new class loader for the detected changed class; and
    the new class loader reloading the changed class in the application;
    wherein said detecting the class has been changed, said replacing the class loader and said reloading the changed class are performed while the application is executing.

2. The method as recited in claim 1, wherein only the changed class and other classes with dependencies on the changed class are reloaded in response to said detecting the class has been changed.

3. The method as recited in claim 1, wherein said detecting the class has been changed, said replacing the class loader and said reloading the changed class are performed without restarting the application.

4. The method as recited in claim 1, further comprising:
    the class loader controller receiving a request to load the class prior to the class loader loading the class; and
    the class loader controller determining that the class loader in the hierarchal stack of class loaders is responsible for loading the class.

5. The method as recited in claim 1, further comprising:
    registering the loaded class with a dirty class monitor; and
    the dirty class monitor performing said detecting the class has been changed.

6. The method as recited in claim 5, further comprising:
    the dirty class monitor notifying a class loader controller that the class has been changed;
    the class loader controller performing said replacing the class loader in the hierarchy of class loaders with the new class loader for the class in response to said notification; and
    the class loader controller invoking the new class loader to perform said reloading the changed class in the application.

7. The method as recited in claim 1, further comprising:
    determining one or more classes with dependencies on the changed class;
    replacing one or more class loaders in the hierarchy of class loaders, wherein the one or more class loaders are each configured to load one or more of the one or more classes with dependencies on the changed class; and
    the one or more class loaders each reloading the one or more classes in the application with dependencies on the changed class which the particular class loader is configured to load, wherein said reloading is performed while the application is executing.

8. The method as recited in claim 1, wherein the application is one of a plurality of applications executing within an application server, wherein each of the one or more applications is associated with an application-specific hierarchy of class loaders configured to load classes in the particular application.

9. The method as recited in claim 8, wherein the application-specific hierarchy of class loaders in each application is configured to load the classes in the particular application while the particular application is executing.

10. The method as recited in claim 8, wherein each of the class loaders in the application-specific hierarchy of class loaders in each application is configured to be replaced to reload one or more changed classes in the particular application while the particular application is executing.

11. The method as recited in claim 8, wherein the application server is based on a platform independent multi-tier application server framework.

12. The method as recited in claim 1, wherein the application comprises one or more modules, wherein the hierarchical stack of class loaders includes a module class loader for each module in the application, and wherein the module class loader associated with a particular module is configured to load one or more classes of the particular module.

13. The method as recited in claim 12, wherein the hierarchical stack of class loaders further includes an application class loader, wherein the application class loader is the parent class loader of the one or more module class loaders in the hierarchical stack of class loaders.

14. The method as recited in claim 13, wherein the application class loader is configured to load utility classes used in the application.

15. The method as recited in claim 13, wherein the application class loader is configured to load classes used by more than one module in the application.

16. The method as recited in claim 13, wherein the application is executing within an application server, wherein the application server includes a system class loader, wherein the system class loader is the parent class loader of the application class loader in the hierarchical stack of class loaders.

17. The method as recited in claim 16, wherein the system class loader is configured to load standard classes.

18. The method as recited in claim 16, wherein the system class loader is configured to load core classes of the application server.

19. The method as recited in claim 12, wherein the stack of class loader further includes one or more class loaders based on a platform independent component architecture for multi-tier client/server systems, wherein each of the one or more class loaders is a child of one module class loader in the hierarchical stack of class loaders.

20. The method as recited in claim 12, wherein the stack of class loaders further includes one or more Web class loaders, wherein each of the one or more Web class loaders is a child of one module class loader in the hierarchical stack of class loaders.

21. A method for dynamically reloading classes in an application executing within an application server, the method comprising:
  changing a class used by the application;
  a class loader controller replacing a class loader for the class in the application with a new class loader for the changed class, wherein the class loader is one of a hierarchal stack of class loaders each configured to load one or more classes in the application, wherein the class loader controller provides an interface to the hierarchal stack of class loaders and a common entry point for loading classes of the application;
  the class loader controller replacing one or more class loaders for one or more classes with dependencies on the changed class, wherein the one or more class loaders are included in the hierarchical stack of class loaders;
  the new class loader, in response to an invocation from the class loader controller, reloading the changed class; and
  the replaced one or more class loaders reloading the one or more classes in the application with dependencies on the changed class;
  wherein only the class loaders for the changed class and the one or more classes with dependencies on the changed class are replaced in response to said changing the class; and
  wherein said replacing the class loaders and said reloading the classes are performed while the application is executing without restarting the application.

22. The method as recited in claim 21, wherein the application comprises one or more modules, wherein each module in the application is associated with a module class loader for the particular module configured to load one or more classes of the particular module, and wherein the one or more module class loaders are included in the hierarchical stack of class loaders.

23. The method as recited in claim 22, wherein the hierarchical stack of class loaders includes an application class loader configured to load classes used by more than one module in the application, and wherein the application class loader is the parent class loader of the one or more module class loaders in the hierarchical stack of class loaders.

24. The method as recited in claim 23, wherein the hierarchical stack of class loader further includes one or more class loaders based on a platform independent component architecture for multi-tier client/server systems, wherein each class loaders is a child of one module class loader in the hierarchical stack of class loaders.

25. The method as recited in claim 23, wherein the hierarchical stack of class loaders further includes one or more Web class loaders, wherein each Web class loader is a child of one module class loader in the hierarchical stack of class loaders.

26. The method as recited in claim 23, wherein the application server includes a system class loader configured to load core classes of the application server, wherein the system class loader is the parent class loader of the application class loader in the hierarchical stack of class loaders.

27. The method as recited in claim 21, wherein the application server is operable to execute a plurality of applications, wherein each application includes a hierarchical stack of class loaders configured to load classes for the particular application.

28. The method as recited in claim 21, wherein the application server is based on a platform independent multi-tier application server framework.

29. A system comprising:
  a processor;
  a memory operable to store program instructions, wherein the program instructions implement an application server executable by the processor within the system, wherein the program instructions further implement a plurality of applications executable by the processor within the system;
  wherein the application server is operable to provide access to the plurality of applications to clients of the application server;
  wherein one or more of the plurality of applications each includes a dynamic class reloading module comprising a hierarchical stack of class loaders, wherein the hierarchical stack of class loaders includes a separate class loader for each module in the particular application, and wherein each class loader is operable to reload one or more classes used by the particular application;
  wherein, for each of the one or more applications, the dynamic class reloading modules is operable during execution of the application to:
    detect that a class used by the application has been changed;
    replace a class loader for the class in the hierarchical stack of class loaders with a new class loader for the detected changed class; and
    wherein the new class loader is operable to reload the changed class in the first application during execution of the first application.

30. The system as recited in claim 29, wherein said detecting, said replacing and said reloading are performed without restarting the application.

31. The system as recited in claim 30, wherein said detecting, said replacing and said reloading are performed without restarting the application server.

32. The system as recited in claim 29, wherein, for each of the one or more applications, the dynamic class reloading modules is further operable during execution of the application to replace one or more other class loaders in response to said detecting, wherein the one or more other class loaders are operable to reload one or more classes with dependencies on the changed class.

33. The system as recited in claim 29, wherein the class loader controller of each dynamic class reloading module is operable to:
   receive a notification that the class has been changed;
   determine which class loader in the hierarchical stack of class loaders is operable to load the class;
   perform said replacing the class loader with the new class loader; and
   invoke the new class loader to perform said reloading the changed class.

34. The system as recited in claim 33, wherein each dynamic class reloading module further comprises a dirty class monitor operable to:
   perform said detecting that the class used by the application has been changed; and
   notify the class loader controller that the class has been changed.

35. The system as recited in claim 29, wherein the application server is based on a platform independent multi-tier application server framework.

36. A system comprising:
   a processor;
   a memory operable to store program instructions, wherein the program instructions implement an application executable by the processor within the system, wherein the application includes a dynamic class reloading module comprising
      a hierarchical stack of class loaders, wherein each of the hierarchical stack of class loaders is executable to load one or more classes in the application;
      a class loader controller operable to:
         provide an interface to the hierarchal stack of class loaders;
         provide a common entry point for loading classes of the application;
         invoke a class loader to load a class in the application, wherein the class loader is one of the hierarchal stack of class loaders;
         detect the class has been changed;
         replace the class loader in the hierarchy of class loaders with a new class loader for the detected changed class; and
         invoke the new class loader to reload the changed class in the application;
   wherein said detecting the class has been changed, said replacing the class loader and said reloading the changed class are performed while the application is executing.

37. The system as recited in claim 36, wherein only the changed class and other classes with dependencies on the changed class are reloaded in response to said detecting the class has been changed.

38. The system as recited in claim 36, wherein said detecting the class has been changed, said replacing the class loader and said reloading the changed class are performed without restarting the application.

39. The system as recited in claim 36, wherein the class loader controller is executable within the application to:
   receive a request to load the class prior to the class loader loading the class;
   determine that the class loader is responsible for loading the class; and
   perform said invoking the class loader to load the class in the application.

40. The system as recited in claim 36, wherein the class loader controller is executable within the application to perform said detecting the class has been changed.

41. The system as recited in claim 40, wherein the class loader controller is executable within the application to;
   receive notification from the dirty class monitor that the class has been changed;
   perform said replacing the class loader in the hierarchy of class loaders with the new class loader for the class in response to said receiving notification; and
   perform said invoking the new class loader to reload the changed class in the application.

42. The system as recited in claim 36, wherein the class loader controller is executable within the application to:
   receive notification that the class has been changed;
   perform said replacing the class loader in the hierarchy of class loaders with the new class loader for the class in response to said receiving notification; and
   perform said invoking the new class loader to reload the changed class in the application.

43. The system as recited in claim 36, wherein the application is further executable within the system to:
   determine one or more classes with dependencies on the changed class;
   replace one or more class loaders in the hierarchy of class loaders, wherein the one or more class loaders are each configured to load one or more of the one or more classes with dependencies on the changed class; and
   invoke each of the one or more class loaders to reload the one or more classes in the application with dependencies on the changed class which the particular class loader is configured to load.

44. The system as recited in claim 36, wherein the program instructions further implement an application server executable within the system and a plurality of applications executable within the application server, wherein the application is one of the plurality of applications, wherein each of the one or more applications is associated with an application-specific hierarchy of class loaders configured to load classes in the particular application.

45. The system as recited in claim 44, wherein each of the plurality of applications is executable within the application server to invoke one or more of the hierarchy of class loaders to load the classes in the particular application while the particular application is executing within the application server.

46. The system as recited in claim 45, wherein each of the plurality of applications is executable within the application server to:
   replace one or more of the class loaders in the application-specific hierarchy of class loaders in the particular application; and
   invoke each of the replaced one or more class loaders to reload one or more changed classes in the particular application while the particular application is executing.

47. The system as recited in claim 45, wherein the application server is based on a platform independent multi-tier application server framework.

48. The system as recited in claim 36, wherein the application comprises one or more modules, wherein the hierarchical stack of class loaders includes a module class loader for each module in the application, and wherein the module class loader associated with a particular module is configured to be invoked by the application to load one or more classes of the particular module.

49. The system as recited in claim 48, wherein the hierarchical stack of class loaders further includes an application class loader, wherein the application class loader is the parent class loader of the one or more module class loaders in the hierarchical stack of class loaders, and wherein the application class loader is configured to be invoked by the application to load classes used by more than one module in the application.

50. The system as recited in claim 49, wherein the application is executing within an application server, wherein the application server includes a system class loader, wherein the system class loader is the parent class loader of the application class loader in the hierarchical stack of class loaders, and wherein the system class loader is configured to be invoked by the application to load core classes of the application server.

51. The system as recited in claim 48, wherein the stack of class loader further includes one or more class loaders based on a platform independent component architecture for multi-tier client/server systems, wherein each of the one or more class loaders is a child of one module class loader in the hierarchical stack of class loaders.

52. The system as recited in claim 48, wherein the stack of class loaders further includes one or more Web class loaders, wherein each of the one or more Web class loaders is a child of one module class loader in the hierarchical stack of class loaders.

53. A carrier medium comprising program instructions, wherein the program instructions are computer-executable to implement:

a class loader, in response to an invocation from a class loader controller, loading a class in the application wherein the class loader is one of a hierarchal stack of class loaders each configured to load one or more classes in the application, wherein the class loader controller provides an interface to the hierarchal stack of class loaders and a common entry point for loading classes of the application;

detecting the class has been changed;

the class loader controller replacing the class loader in the hierarchy of class loaders with a new class loader for the detected changed class; and the new class loader reloading the changed class in the application;

wherein said detecting the class has been changed, said replacing the class loader and said reloading the changed class are performed while the application is executing.

54. The carrier as recited in claim 53, wherein only the changed class and other classes with dependencies on the changed class are reloaded in response to said detecting the class has been changed.

55. The carrier medium as recited in claim 53, wherein said detecting the class has been changed, said replacing the class loader and said reloading the changed class are performed without restarting the application.

56. The carrier medium as recited in claim 53, wherein the program instructions are further computer-executable to implement:

the class loader controller receiving a request to load the class prior to the class loader loading the class; and the class loader controller determining that the class loader is responsible for loading the class.

57. The carrier medium as recited in claim 53, wherein the program instructions are further computer-executable to implement:

notifying the class loader controller that the class has been changed;

the class loader controller performing said replacing the class loader in the hierarchy of class loaders with the new class loader for the class in response to said notification; and the class loader controller invoking the new class loader to perform said reloading the changed class in the application.

58. The carrier medium as recited in claim 53, wherein the program instructions are further computer-executable to implement:

determining one or more classes with dependencies on the changed class;

replacing one or more class loaders in the hierarchy of class loaders, wherein the one or more class loaders are each configured to load one or more of the one or more classes with dependencies on the changed class; and the one or more class loaders each reloading the one or more classes in the application with dependencies on the changed class which the particular class loader is configured to load, wherein said reloading is performed while the application is executing.

59. The carrier medium as recited in claim 53, wherein the application is one of a plurality of applications executing within an application server, wherein each of the one or more applications is associated with an application-specific hierarchy of class loaders configured to load classes in the particular application, wherein each of the class loaders in the application-specific hierarchy of class loaders in each application is configured to be replaced to reload one or more changed classes in the particular application while the particular application is executing.

60. The carrier medium as recited in claim 59, wherein the application server is based on a platform independent multi-tier application server framework.

61. The carrier medium as recited in claim 53, wherein the application comprises one or more modules, wherein the hierarchical stack of class loaders includes a module class loader for each module in the application, and wherein the module class loader associated with a particular module is configured to load one or more classes of the particular module;

wherein the hierarchical stack of class loaders further includes an application class loader, wherein the application class loader is the parent class loader of the one or more module class loaders in the hierarchical stack of class loaders, and wherein the application class loader is configured to load classes used by more than one module in the application.

62. The carrier medium as recited in claim 61, wherein the application is executing within an application server, wherein the application server includes a system class loader, wherein the system class loader is the parent class loader of the application class loader in the hierarchical stack of class loaders, wherein the system class loader is configured to load core classes of the application server.

63. A class loader module executable within an application executing within an application server, comprising:
- a hierarchal stack of class loaders each configured to load one or more classes in the application;
- a class loader controller configured to provide an interface to a hierarchal stack of class loaders and a common entry point for loading classes of the application;
- a dirty class monitor operable to:
  - detect that a class used by the application has been changed; and
  - notify the class loader controller that the class has been changed.

64. The class loader module as recited in claim 63, wherein the class loader controller is configured to:
- receive a notification from the dirty class monitor that the class has been changed;
- determine a class loader in the hierarchal stack of class loaders operable to load the changed class;
- replace the class loader in the hierarchal stack of class loaders with a new class loader for the changed class, wherein the new class loader is operable to reload the changed class in the application during execution of the application; and
- invoke the new class loader to reload the changed class.

65. The class loader module as recited in claim 64, wherein said detecting, said notifying and said replacing are preformed without restarting the application or the application server.

66. The class loader module as recited in claim 64, wherein the class loader controller is further configured to replace one or more other class loaders is response to said receiving, wherein the one or more other class loaders are operable to reload one or more classes with dependencies on the changed class.

* * * * *